Aug. 31, 1965  W. J. MAHONEY ETAL  3,204,123
MONOSTABLE PULSE GENERATING CIRCUIT UNRESPONSIVE TO POWER SUPPLY
FLUCTUATIONS AND HAVING FAST RESET TIME
Filed Jan. 9, 1963
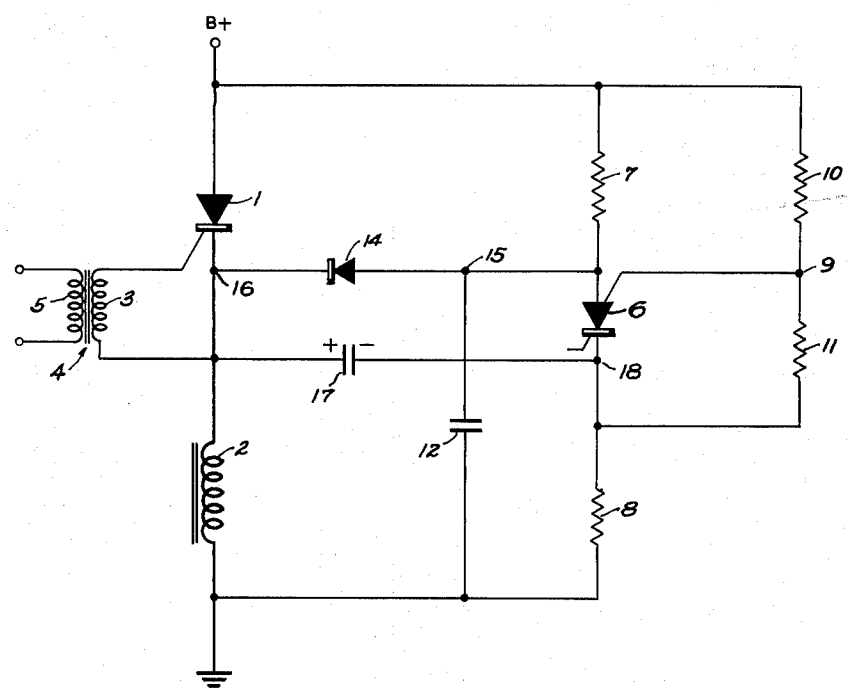
*INVENTOR.*
WILLIAM J. MAHONEY
JOHN L. LORENZO
BY

United States Patent Office 3,204,123
Patented Aug. 31, 1965

3,204,123
MONOSTABLE PULSE GENERATING CIRCUIT UNRESPONSIVE TO POWER SUPPLY FLUCTUATIONS AND HAVING FAST RESET TIME
William J. Mahoney, Darien, and John L. Lorenzo, Sandy Hook, Conn., assignors to American Machine & Foundry Company, a corporation of New Jersey
Filed Jan. 9, 1963, Ser. No. 250,439
7 Claims. (Cl. 307—88.5)

This invention relates to a monostable pulse generating circuit and more particularly to such a circuit for providing pulses of uniform time duration regardless of ambient temperature or power supply voltage changes.

In copending appliction Serial No. 181,337 filed March 21, 1962, a unique type of monostable pulse generating circuit is illustrated which, while not limited to any particular use, has been found particularly useful in providing pulse energization to inductive load devices such as electromechanical relays. The circuit there described includes an internally regenerative semiconductor, such as a silicon controlled rectifier, which is triggered into the conductive state to energize the load device and is thereafter automatically returned to the nonconductive state by means of a time circuit, which includes a four-layer diode and capacitor combination. The time duration of the output pulses is determined by the time required for the capacitor to acquire a charge greater than the breakdown potential of the four-layer diode. It has been found that the four-layer diode breakdown potential varies in accordance with ambient temperature and that the charge rate of the capacitor changes in accordance with changes in power supply voltage. Accordingly, the circuit described in the copending application cannot readily be used in installations where the time duration of the pulses must be maintained constant within a high degree of accuracy.

Accordingly, it is an object of this invention to provide a monostable pulse generating circuit capable of providing pulses of substantially constant time duration regardless of ambient temperature and power supply changes.

It is another object to provide such a circuit capable of providing pulses of sufficient energy for energizing inductive loads such as electromechanical relays.

It is still another object of this invention to provide a monostable pulse generating circuit which can be reset rapidly to begin a subsequent pulse generating cycle.

The pulse generating circuit, in accordance with this invention, includes a silicon controlled switch, or like device, which can be connected so that its breakdown potential varies in accordance with the power supply voltage, but is relatively unaffected by ambient temperature. The controlled switch is connected in parallel with a capacitor which charges at a rate dependent upon the power supply voltage. When the potential across the capacitor exceeds the breakdown potential of the controlled switch, the controlled switch becomes conductive and discharges the capacitor. The time required for the capacitor potential to exceed the breakdown potential of the controlled switch remains substantially constant since the rate at which the capacitor charges, and the breakdown potential of the controlled switch, both increase with increases in power supply voltage. The timer circuit is connected to a controlled rectifier, which in turn controls energization of the load device. The connections are such that the capacitor begins to charge when the controlled rectifier is rendered conductive, and such that the controlled rectifier is returned to the normal nonconductive state when the controlled switch in the timing circuit becomes conductive. Thus, once the controlled rectifier is triggered into the conductive state, it remains conductive for a predetermined time interval as controlled by the timer circuit. Where the load device is inductive, the reverse potential which is developed when current flow through the inductive device ceases, is utilized to rapidly return the controlled switch to the nonconductive state so as to rapidly reset the pulse generating circuit for a new pulse generating cycle.

The invention, with respect to the foregoing and other objects, may be better understood by referring to the following specification and drawing, the drawing forming a portion of the specification, and wherein an electrical schematic diagram is shown illustrating one embodiment of the invention.

The circuit includes a controlled rectifier 1 which is connected to selectively control energization of an inductive load device 2. More specifically, the anode of the controlled rectifier is connected to a positive source of potential B+ and the cathode thereof is connected to one end of the inductive load, the other end of the inductive load being connected to ground. The secondary winding 3 of a transformer 4 is connected between the gate element and the cathode of controlled rectifier 1. A primary winding 5 of transformer 4 is adapted to receive pulses which render the gate element of controlled rectifier 1 positive with respect to the cathode.

A controlled rectifier is a four-layer PNPN semiconductor device which is normally nonconductive and prevents current flow in either direction between the anode and cathode. However, if a positive potential is applied to the gate element, the controlled rectifier becomes conductive and permits current flow from the anode to the cathode thereof, and thereafter is maintained in a conductive state by means of internal regeneration. The controlled rectifier can thereafter be returned to the nonconductive state by reversing the anode-cathode potential to thereby reduce current flow through the controlled rectifier to below the level required to maintain internal regeneration.

The timer circuit, which is utilized to return the controlled rectifier to the nonconductive state after a predetermined time interval, includes a controlled switch 6. A controlled switch is also PNPN four-layer semiconductor device. The outer P and N elements form the anode and cathode, respectively. The anode is connected to a positive source of potential B+ via a resistor 7 and the cathode is connected to ground via a resistor 8. Leads are connectable to the intermediate P and N elements, which form gate elements, but as illustrated in the diagram, the P layer is not connected. The gate element formed by the intermediate N layer is connected to a junction 9 provided by a voltage divider including resistors 10 and 11 connected in series. The ends of the voltage divider are connected respectively to the positive source of potential B+ and to the cathode of controlled switch 6.

A controlled switch, in its non-conductive state, blocks current flow in either direction. Of the several possible modes of initiating conduction which are available in the controlled switch, the one most useful in this invention is to cause the anode to become 0.7 volt positive with respect to the upper N junction. When this occurs, regeneration within the device will cause the conduction state. It will be noted that no connection is necessary to the second P layer in this mode of operation. A controlled switch is returned to the non-conducting state when current flow is reduced below the holding level of the device. A faster recovery can be obtained if the anode-cathode is reverse biased, thereby sweeping out stored minority carriers.

It will be seen that a bridge arrangement exists across the controlled switch whose arms consist of resistors 10 and 11 and resistor 7, condenser 12. Resistor 8, being small in relation to resistors 10, 11 may be ignored. Resistor 7 and condenser 12 are the elements of the RC timing network. When timing starts, by a means to be later described, junction 15 is drawn near ground by the initial condenser charging current. As charging continues the potential at junction 15 rises until it becomes 0.7 volt more positive than the potential established at junction 9 by the resistors 10, 11. At this point, the upper PN junction of the controlled switch 6 becomes forward biased and the device conducts heavily. The ratio of resistors 10, 11 is usually chosen to set junction 9 at 60% of the supply voltage, equivalent to one time constant of the RC timing network. As this ratio is independent of voltage and the RC charging time constant also is independent of voltage, the timing interval will thereby remain constant, regardless of the supply fluctuations. As the voltage-temperature coefficient of the PN diode is very small (2.3 mv./° C.) in relation to the suply voltage, the circuit is also stable against temperature variations.

When the controlled switch 6 conducts, condenser 12 is caused to discharge heavily through resistor 8, thus bringing junction 18 to 60% of +B.

Diode 14 is utilized to prevent capacitor 12 from charging unless controlled rectifier 1 is in a conductive state. The anode of diode 14 is connected to a junction 15 to which the anode of controlled switch 6 and capacitor 12 are connected, and the cathode of diode 14 is connected to a junction 16 between controlled rectifier 1 and inductive load 2. A controlled rectifier provides a very high anode to cathode impedance when non-conductive, and therefore the potential at junction 16 is negligible when the controlled rectifier is in the nonconductive state. Under these circumstances, diode 14 clamps junction 15 at essentially ground potential and therefore prevents capacitor 12 from charging. When controlled rectifier 1 becomes conductive, the anode to cathode impedance becomes negligible and therefore, the potential at junction 16 is essentially the same as that at the power supply voltage B+ and therefore, diode 14 becomes back-biased and permits the potential at junction 15 to rise as capacitor 12 charges.

A capacitor 17 is connected between junction 16 and junction 18, junction 18, being between the cathode of controlled switch 6 and resistor 8. The potential at junction 18 is negligible when controlled switch 6 is nonconductive because of the high anode-cathode impedance under these circumstances or is highly positive when controlled switch 6 becomes conductive reducing the anode-cathode impedance to a negligible amount.

Initially, neither of the semiconductor devices is conductive and therefore, diode 14 prevents capacitor 12 from charging, and the negligible potential at junctions 16 and 18 prevents capacitor 17 from charging. When a pulse is applied to primary winding 5, a positive potential appears at the gate element of controlled rectifier 1 rendering it conductive. When in the conductive state, the controlled rectifier permits current flow from the positive source of potential B+ through the inductive load 2 to ground. Under these circumstances, junction 16 becomes highly positive and diode 14 becomes back-biased permitting capacitor 12 to charge. The increase of potential at junction 16 causes capacitor 17 to charge with a polarity as indicated in the diagram, since junction 18 is still at essentially ground potential.

When the charge on capacitor 12 exceeds the breakdown ratio of controlled switch 6, the controlled switch 6 becomes conductive and junction 18 therefore becomes highly positive because of current flow through resistor 8. Because of the charge on capacitor 17, junction 16 is driven further positive making the cathode of controlled rectifier 1 positive with respect to the anode, thus, returning the controlled rectifier to the nonconductive state. As soon as controlled rectifier 1 becomes nonconductive, current flow ceases through inductive load 2, and as the magnetic field of the inductive load collapses, a reverse potential is generated. The reverse voltage caused by the collapsing field of load 2 is not allowed to become large, as condenser 12 and diode 14 act as low impedance shunt paths for the current. When the small voltage across inductor 2 dies away, point 16 goes to ground less the IR drop of the inductor. The anode of diode 14 is therefore close to ground and also the anode of control switch 6 is near ground. The anode of control switch 6 is thereby made more negative than the bridge junction at point 9, and device 6 is thereby caused to cease conduction. Accordingly, controlled switch 6 is quickly returned to the non-conductive state. The remaining charge on capacitor 12 is dissipated through diode 14 and inductive load 2, whereas the charge on capacitor 17 is dissipated through resistor 8 and inductive load 2. Thus, the circuit very quickly returns to the initial state.

It should be noted that the circuit illustrated in the diagram is operative with resistive loads connected in place of inductive load 2. The only essential difference is that the controlled switch is not returned to the nonconductive state by means of the reverse potential developed by the inductive load. The controlled switch would, instead, be returned to the nonconductive state when the charge on capacitor 12 is sufficiently dissipated so that the current flow through the controlled switch drops to a value below the level required to maintain the controlled switch inductive. The required holding level for a controlled switch is very low and therefore, the time required to return the controlled switch to the nonconductive state may be appreciable, and therefore, it is more desirable to utilize the circuit in connection with inductive loads.

While only one embodiment of the invention has been illustrated in detail, there are numerous changes which could be made without departing from the scope of this invention. The invention is more particularly defined in the appended claims:

What is claimed is:

1. In a monostable pulse generating circuit, the combination of a first normally nonconductive semiconductor device which remains conductive once triggered into a conductive state, circuit means for selectively triggering said first semiconductor device into a conductive state, a capacitor, a source of potential, charging circuit means to commence charging said capacitor from said source of potential when said first semiconductor device becomes conductive and to charge said capacitor at a rate dependent upon the magnitude of potential at the source, a second normally nonconductive semiconductor device characterized by having a turn-on potential effective, when exceeded, to cause said second semiconductor device to conduct, means for applying a selected proportion of the potential from said source to said second semiconductor device, discharging circuit means including said capacitor connected to said second semiconductor device and effective, when the charging potential appearing across said capacitor exceeds said selected proportion of said source of potential by an amount at least as great as said turn-on potential, to cause said second semiconductor device to become conductive and discharge said capacitor, and circuit means connected between said first semiconductor device and said discharging circuit means to return said first semiconductor device to the nonconductive state a predetermined time after said second semiconductor device becomes conductive.

2. In a monostable pulse generating circuit, the combination of an inductive load, a first normally nonconductive semiconductor device which remains conductive once triggered into a conductive state and which is connectable to energize said inductive load device when conductive, circuit means for selectively triggering said first semiconductor device into a conductive state, a capacitor, a source of potential, charging circuit means to commence charging said capacitor from said source of potential when said first semiconductor device becomes conductive and to charge said capacitor at a rate dependent upon the magnitude of potential at the source, a second normally nonconductive semiconductor device having a turn-on potential effective, when exceeded, to cause said second semiconductor device to conduct, means for applying a selected proportion of the potential from said source to said second semiconductor device, discharging circuit means including said capacitor connected to said second semiconductor device and effective when the charging potential appearing across said capacitor exceeds said selected proportion of said source of potential by an amount at least as great as said turn-on potential, to cause said second semiconductor device to become conductive and discharge said capacitor, and circuit means interconnected between said first and second semiconductor devices to return said first semiconductor device to the nonconductive state when said second semiconductor device become conductive and to thereafter return said second semiconductor device to the nonconductive state when the magnetic field of the inductive load collapses with cessation in the supply of energizing current through said first semiconductor device to said inductive load.

3. In a monostable pulse generating circuit, the combination of a four-layer semiconductor device which is normally nonconductive, but once triggered into a conductive state thereafter remains conductive by means of internal regeneration, circuit means for selectively triggering said four-layer device into a conductive state, a source of potential, timer circuit means comprising said capacitor and a semiconductor controlled switch both connected to a source of potential so that said controlled switch becomes conductive at a predetermined time after said timer circuit means is activated regardless of the magnitude of potential at the source, circuit means for activating said timer circuit means when said four-layer device becomes conductive, and circuit means for returning said four-layer device to the nonconductive state when said controlled switch becomes conductive.

4. In a monostable pulse generating circuit, the combination of an inductive load device a controlled rectifier operatively connected to permit energization of said inductive load device when conductive, trigger circuit means for selectively triggering said controlled rectifier into a conductive state, timer circuit means comprising a capacitor, a source of potential, charging circuit means for charging said capacitor from said source of potential at a rate dependent upon the magnitude of potential at the source, a controlled switch having a control element and characterized by having a turn-on potential effective, when exceeded, to cause said controlled switch to conduct, voltage divider means for providing a potential to said control element which is proportional to the magnitude of potential at the source, and discharging circuit means for rendering said controlled switch conductive to discharge said capacitor when the potential across said capacitor exceeds said proportion of said potential by an amount at least as great as said turn-on potential, first circuit means operatively connected to prevent charging of said capacitor unless said controlled rectifier is conductive, and second circuit means operatively connected to return said controlled rectifier to the nonconductive state when said controlled switch becomes conductive and to thereafter return said controlled switch to the nonconductive state when the magnetic field of said inductive load collapses.

5. In a monostable pulse generating circuit in accordance with claim 4 wherein said first circuit means includes a diode interconnected between said controlled rectifier and said capacitor.

6. A monostable pulse generating circuit in accordance with claim 4 wherein said second circuit means includes a capacitor interconnected between said controlled rectifier and said controlled switch.

7. In a monostable pulse generating circuit, the combination of a first normally nonconductive semiconductor device which remains conductive once triggered into a conductive state, circuit means for selectively triggering said first semiconductor device into a conductive state, a capacitor, a source of potential first and second resistors connected in series across said source of potential and forming first and second arms of a bridge circuit, a third resistor and said capacitor connected in series across said source of potential and forming third and fourth arms of said bridge circuit, a second normally nonconductive semiconductor device connected in parallel across said capacitor, said second semiconductor having a gate terminal for applying a gating potential thereto, said terminal being connected to the junction point between said first and second resistors of said bridge circuit, charging circuit means for selectively causing said capacitor to commence charging from said source of potential when said first semiconductor device becomes conductive, said second semiconductor device being operative to conduct and discharge said capacitor when the charging potential appearing across said capacitor exceeds the potential applied to said gating terminal by a predetermined amount, and circuit means connected between said first semiconductor device and said second semiconductor device to return said first semiconductor device to the nonconductive state when said second semiconductor device becomes conductive.

References Cited by the Examiner

"Notes on the Application of the Silicon Controlled Rectifier," Semiconductor Products Dept., General Electric Co., Figure 10, Dec. 4, 1958.

JOHN W. HUCKERT, *Primary Examiner.*

ARTHUR GAUSS, *Examiner.*